US 11,260,337 B2

(12) United States Patent
Griffiths et al.

(10) Patent No.: US 11,260,337 B2
(45) Date of Patent: Mar. 1, 2022

(54) PROCESS FOR THE REMOVAL OF CARBON DIOXIDE AND HEAVY HYDROCARBONS

(71) Applicant: UOP LLC, Des Plaines, IL (US)

(72) Inventors: John Louis Griffiths, Arlington Heights, IL (US); Shain-Jer Doong, Kildeer, IL (US); James Robert Gaspar, Roselle, IL (US)

(73) Assignee: UOP LLC, Des Plaines, IL (US)

( * ) Notice: Subject to any disclaimer, the term of this patent is extended or adjusted under 35 U.S.C. 154(b) by 394 days.

(21) Appl. No.: 16/365,609

(22) Filed: Mar. 26, 2019

(65) Prior Publication Data

US 2019/0299151 A1 Oct. 3, 2019

Related U.S. Application Data

(60) Provisional application No. 62/650,243, filed on Mar. 29, 2018.

(51) Int. Cl.
| | | |
|---|---|---|
| *C10G 21/20* | (2006.01) | |
| *C10G 53/08* | (2006.01) | |
| *B01D 53/04* | (2006.01) | |
| *B01D 53/14* | (2006.01) | |
| *C10G 25/00* | (2006.01) | |

(Continued)

(52) U.S. Cl.
CPC ..... *B01D 53/0423* (2013.01); *B01D 53/1493* (2013.01); *B01D 53/263* (2013.01); *C08G 63/16* (2013.01); *C10G 21/20* (2013.01); *C10G 25/003* (2013.01); *C10G 53/08* (2013.01); *B01D 2252/204* (2013.01); *B01D 2252/2023* (2013.01); *B01D 2253/20* (2013.01); *B01D 2257/304* (2013.01); *B01D 2257/504* (2013.01);

(Continued)

(58) Field of Classification Search
None
See application file for complete search history.

(56) References Cited

U.S. PATENT DOCUMENTS 4,070,165 A * 1/1978 Colton ................. B01D 53/14
62/621
4,150,962 A * 4/1979 Colton ................. B01D 53/14
208/351

(Continued)

OTHER PUBLICATIONS

Tlili et al., Carbon Dioxide Capture and recovery by means of TSA and/or VSA, International Journal of Greenhouse Gas Control, vol. 3, 2009, pp. 519-527, Elsevier.

(Continued)

*Primary Examiner* — Tam M Nguyen
(74) *Attorney, Agent, or Firm* — Paschall & Associates, LLC; Mark Goldberg

(57) ABSTRACT

The invention provides a process to purify a gas stream by using an adsorbent bed and a secondary device to remove heavy hydrocarbons with a recycle stream then sent first to a vessel containing an amine solvent to remove acid gases including carbon dioxide and hydrogen sulfide and then in most embodiments of the invention sending the treated gas stream to a dehydration unit such as an adsorbent bed or to a triethylene glycol absorbent to remove water. The invention further provides improved integration of the process streams to allow for smaller amine solvent and dehydration units as compared to the prior art.

16 Claims, 10 Drawing Sheets

(51) Int. Cl.
*B01D 53/26* (2006.01)
*C08G 63/16* (2006.01)

(52) U.S. Cl.
CPC .. *B01D 2257/80* (2013.01); *C10G 2300/1096* (2013.01); *C10G 2300/207* (2013.01)

(56) References Cited

U.S. PATENT DOCUMENTS

| | | | | |
|---|---|---|---|---|
| 4,421,535 | A * | 12/1983 | Mehra | C07C 7/11 62/625 |
| 4,522,793 | A * | 6/1985 | Larson | C07C 7/148 423/230 |
| 4,957,715 | A * | 9/1990 | Grover | B01D 53/02 423/228 |
| 5,248,488 | A * | 9/1993 | Yan | C07C 7/005 423/210 |
| 5,424,051 | A | 6/1995 | Nagji et al. | |
| 5,846,295 | A | 12/1998 | Kalbassi et al. | |
| 6,521,020 | B2 * | 2/2003 | Butwell | B01D 53/04 423/228 |
| 6,610,124 | B1 * | 8/2003 | Dolan | C10L 3/10 95/98 |
| 7,311,758 | B2 | 12/2007 | Thomas et al. | |
| 7,396,388 | B2 * | 7/2008 | Mitariten | B01D 53/261 95/123 |
| 7,442,233 | B2 | 10/2008 | Mitariten | |
| 7,803,215 | B2 | 9/2010 | Russell et al. | |
| 8,778,050 | B2 | 7/2014 | Dolan et al. | |
| 8,784,533 | B2 | 7/2014 | Leta et al. | |
| 9,211,494 | B2 | 12/2015 | Zhou et al. | |
| 9,528,062 | B2 | 12/2016 | Doong et al. | |
| 2007/0006732 | A1 * | 1/2007 | Mitariten | B01D 53/0462 95/237 |
| 2011/0126707 | A1 | 6/2011 | Noel et al. | |
| 2014/0208797 | A1 * | 7/2014 | Kelley | F25J 1/0278 62/611 |
| 2018/0056229 | A1 * | 3/2018 | Denton | B01D 53/1437 |
| 2018/0071674 | A1 * | 3/2018 | Freeman | B01D 53/1412 |
| 2018/0311609 | A1 * | 11/2018 | McCool | B01D 53/0454 |
| 2018/0339263 | A1 * | 11/2018 | Dehaas | B01D 53/0454 |
| 2021/0069638 | A1 * | 3/2021 | Philbrook | B01D 53/526 |

OTHER PUBLICATIONS

Ntiamoah et al., CO2 Capture by Temperature Swing Adsorption: Use of Hot CO2—Rich Gas for Regeneration, Industrial and Engineering Chemistry Research, 2016, 55, 703-713.

Valenzano et al., Computational and Experimental Studies on the Adsorption of CO, N2, and CO2 on Mg-MOF-74, Journal of Phys. Chem. C, vol. 114, No. 25, 2010.

* cited by examiner

US 11,260,337 B2

1

PROCESS FOR THE REMOVAL OF CARBON DIOXIDE AND HEAVY HYDROCARBONS

This application claims priority from Provisional Application, 62/650,243, filed Mar. 29, 2018, the contents of which are hereby incorporated by reference.

FIELD OF THE INVENTION

The current approach to remove CO2 and heavy hydrocarbons from a natural gas stream involved passing the stream through an amine solvent unit, a dehydration unit to remove the water in the gas stream and then an adsorbent system such as a SeparSIV unit from UOP LLC, Des Plaines, Ill. to remove the heavy hydrocarbons. This approach may lead to high costs for the amine solvent and dehydration units. The high cost tends to squeeze margins and make many opportunities uneconomical to pursue.

SUMMARY OF THE INVENTION

The invention provides a process to purify a gas stream by using an adsorbent bed as well as a secondary device such as a knock-out drum to remove heavy hydrocarbons with a recycle stream then sent first to a vessel containing an amine solvent to remove acid gases including carbon dioxide and hydrogen sulfide (when present) and then sending the treated gas stream to a dehydration unit such as an adsorbent bed or a triethylene glycol absorbent to remove water as well as a knock-out drum or other apparatus to remove condensed liquids. The invention further provides improved integration of the process streams to allow for smaller amine solvent and dehydration units as compared to the prior art.

DETAILED DESCRIPTION OF THE INVENTION

Figure 1:
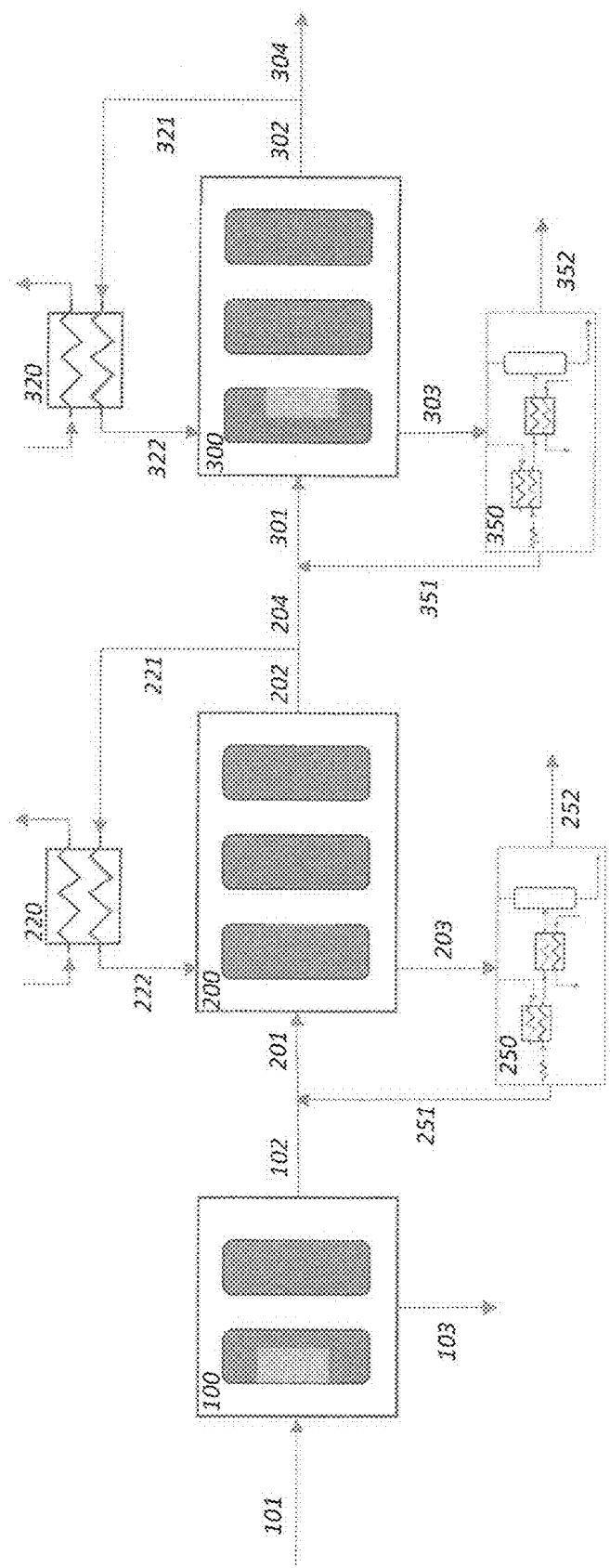
FIG. 1 shows a prior art approach to purify a gas stream of an amine solvent unit, a separate dehydration unit followed by an adsorbent bed to remove heavy hydrocarbons, sulfur compounds and other impurities.

The invention involves changing the positioning of the Amine unit such that the carbon dioxide is removed from the process but it is located in the regeneration process stream and not the feed stream. This makes better use of the adsorbent unit's ability to capture and concentrate carbon dioxide and water. Additionally, further iterations provide the customer of the system a fuel stream which further reduces the load on the Amine unit. Different integrations of the dehydration unit with the system enable additional cost reduction as determined. In a basic embodiment of the present invention, the feed process stream is first fed to the adsorbent unit where the heavy hydrocarbons, water and CO2 are transferred to the regeneration stream. This regeneration stream is then cooled such that a large portion of the heavy hydrocarbons and water are removed into a waste liquids stream. The waste liquids stream is then vaporized and mixed with a portion of the lean regeneration stream to form a fuel stream. The remaining portion of the lean regeneration stream is then transferred to an amine unit where the carbon dioxide and other acid gases are removed to form a sweet-lean regeneration stream. This sweet-lean regeneration stream is then passed to a dehydration unit (adsorption, triethylene glycol (TEG) or other) where a large portion of the water is removed. The dry sweet-lean regeneration stream is then cooled to remove additional levels of heavy hydrocarbons. Finally, the regeneration stream is mixed with feed process stream to be fed to the adsorbent unit. Several embodiments of the invention are shown in the drawings.

FIG. 1 sets forth details of a typical arrangement of a current layout of the process today. The feed gas stream 101, typically pipeline natural gas, is fed to the amine unit 100 where the acid gases are removed through direct contact with an aqueous amine solution to yield a moist sweet feed gas stream 102 and an acid gas stream 103. As a result of the contact with the aqueous amine solution, stream 102 is saturated with water. It is first mixed with the dry regeneration stream 251 creating stream 201 and introduced into the dehydration unit 200. Within this unit, using a bed of adsorbent, the moisture is removed creating a dry sweet feed gas 202. In order to regenerate the adsorbent bed within the dehydration unit 200, a portion of stream 202 (stream 221) is raised to about 288° C. (550° F.) in heater 220 and then fed to the dehydration unit 200 as hot dry regeneration stream 222. Having removed the moisture from the adsorption bed, stream 222 exits the dehydration unit 200 as hot moist regeneration stream 203. Through a series of cooling steps in the water knockout system 250, the water is removed from stream 203 creating a waste water stream 252 and dry regeneration stream 251.

The remaining portion of stream 202, stream 204, is mixed with lean regeneration stream 351 to create stream 301 and introduced into the hydrocarbon adsorption unit 300. Within this unit, using a bed of adsorbent, the heavy hydrocarbons (C5+) are removed to create lean process gas 302. In order to regenerate the adsorbent within the adsorption unit 300, a portion of stream 302 (stream 321) is raised to about 288° C. (550° F.) in heater 320 and then fed to the adsorbent unit 300 as hot lean regen stream 322. Having removed the heavy hydrocarbons from the adsorption bed, stream 322 exits the adsorbent unit 300 as hot rich regeneration stream 303 and a LNG feed 304 exits. Through a series of cooling steps in the heavy knockout system 350, the heavy hydrocarbons are removed from stream 303 to create a waste hydrocarbon stream 352 and a lean regen stream 351. As a result of this arrangement, the amine unit 100 and dehydration unit 200 must be of a large size in order to take the full flow of the process gas stream 101. As a result, high capital and operating costs are present. The element numbers from FIG. 1 and subsequent figures are retained when possible in describing the process of the invention in the following figures.

Figure 2:
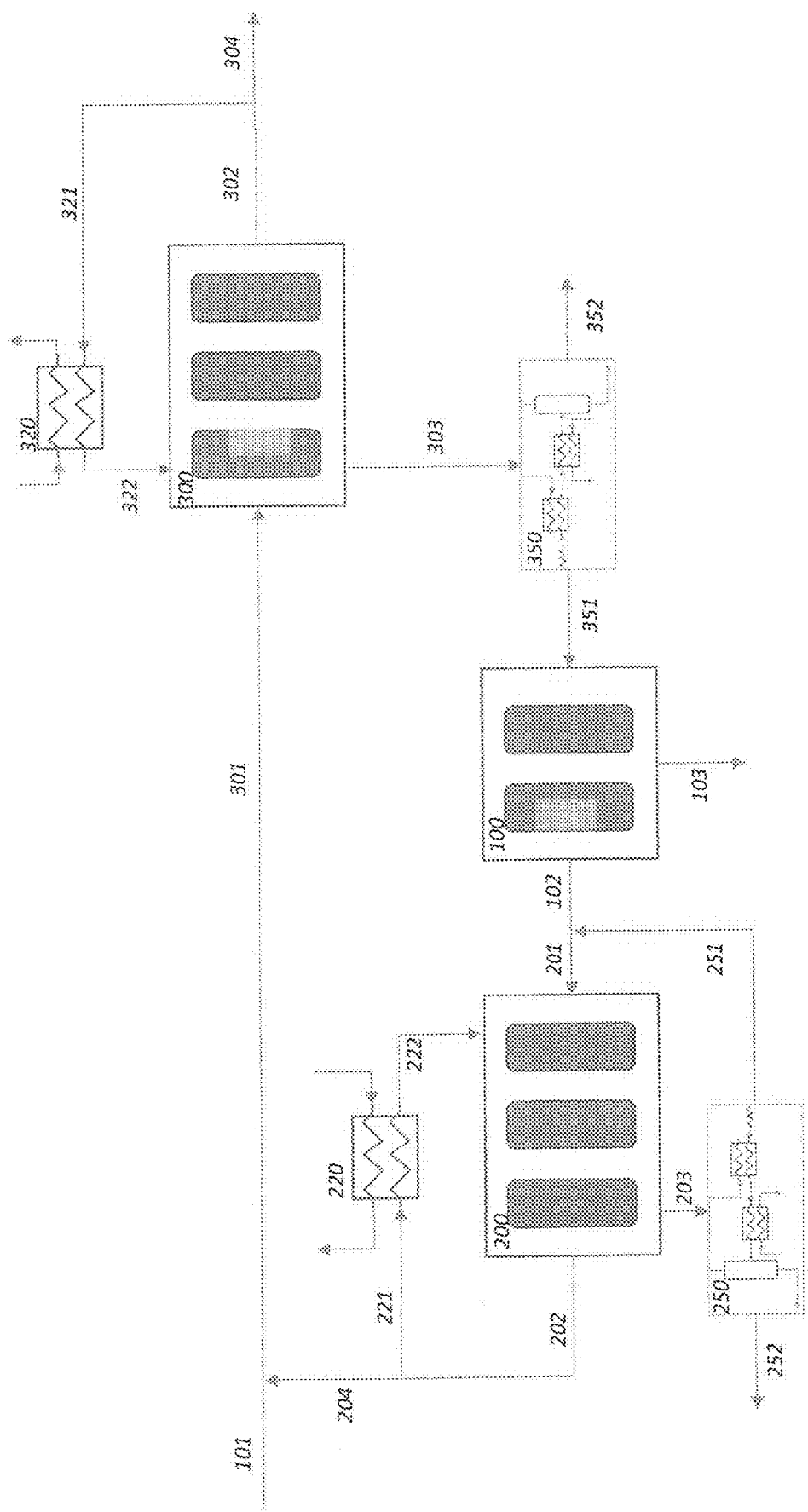
FIG. 2 shows a process to purify a gas stream with an integrated combination of the adsorbent bed, dehydration unit and amine solvent unit.

In FIG. 2, the feed gas stream 101 is mixed with stream 204 and to make stream 301 which then passes to the adsorbent unit 300. Both the heavy hydrocarbons, moisture and carbon dioxide are adsorbed in adsorbent unit 300 and transferred to stream 303. In heavy knockout system 350, in addition to the heavy hydrocarbons a portion of the moisture will be transfer to stream 352. The carbon dioxide and other sour gases meanwhile will remain in stream 351 and then in order to remove them, stream 351 is fed to amine unit 100. As a result of this arrangement the amine unit 100 and dehydration unit 200 are now much smaller than in FIG. 1. Both of these units no longer need to take the full process flow and instead can have parts sized to accommodate regeneration flow 351.

Figure 3:
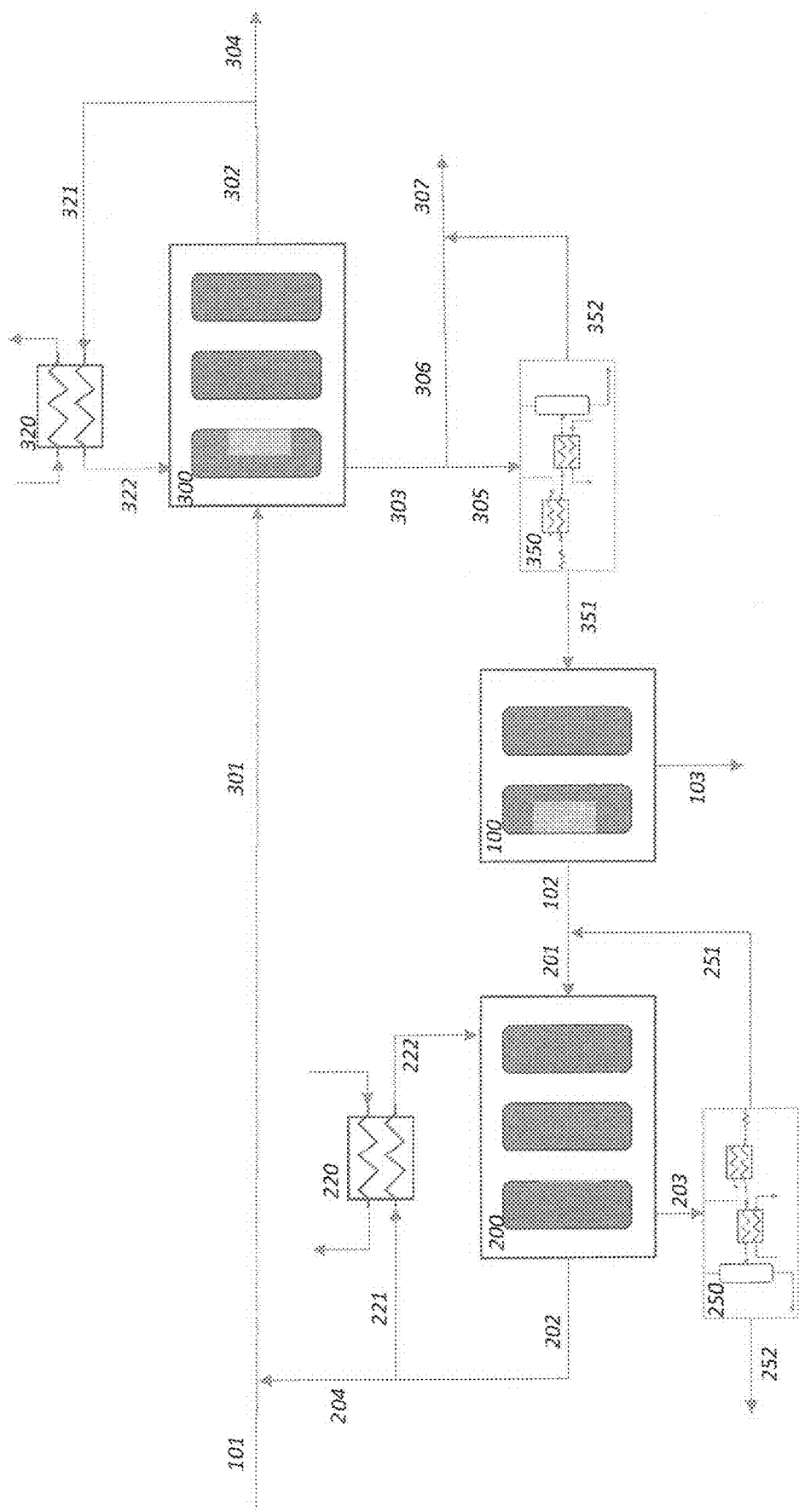
FIG. 3 shows a process to purify a gas stream with an integrated combination of the adsorbent bed, with the dehydration unit and amine solvent unit on a recycle stream of the adsorbent bed.

In FIG. 3, a portion of stream 303 is removed and subsequently mixed with stream 352 to generate fuel gas stream 307. This stream might be used to generate heat to run the regeneration of dehydration unit 200, amine unit 100 or adsorbent unit 300 or additionally used in generating power and heat for other nearby equipment. As a result of this removal of the stream, the lean regeneration stream 351 now has substantially less flow than the comparable streams in FIGS. 1 and 2 and as a result amine unit 100 and dehydration unit 200 are smaller and therefore cheaper to build.

Figure 4:
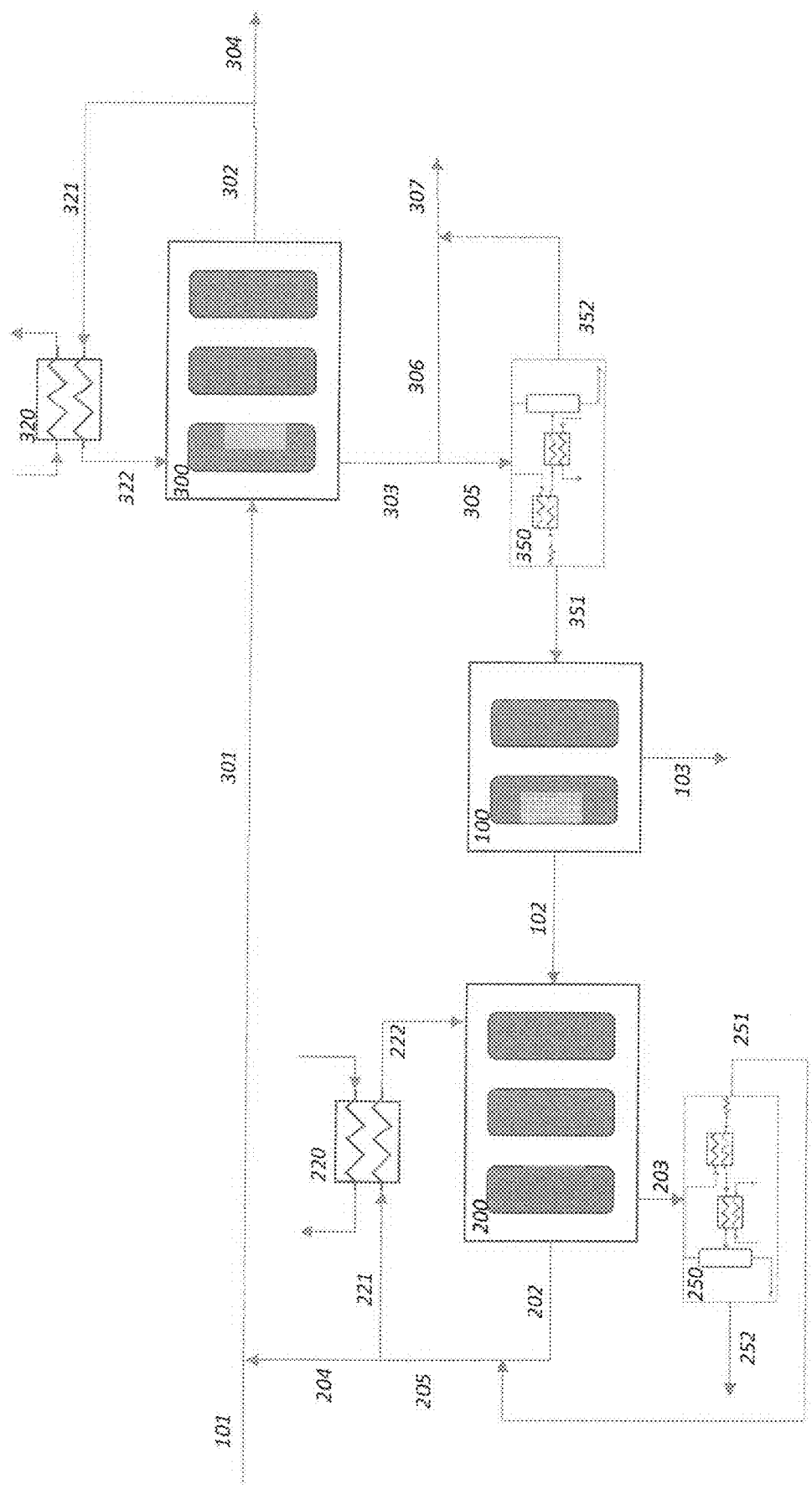
FIG. 4 shows an arrangement for the process that allows for a smaller dehydration unit.

In FIG. 4, the size of the dehydration unit is reduced further by mixing dry regeneration stream 251 with dry sweet feed gas 202 to form stream 205. Given that stream 251 has a higher concentration of moisture than stream 202, the mixing of these streams is usually avoided as it raises the moisture level of the stream 205. The result of using stream 251 to regenerate the dehydration 200 results in the need for additional flow and temperature in the dehydration regeneration loop. However, as any moisture in stream 205 will eventually be removed by the adsorption unit 300, this recycling is not only unnecessary but also adds cost to the facility. A portion of stream 205 is now used as the purge for dehydration unit 200. Being of a lower moisture concentration that stream 205, the regeneration flowrate and/or regeneration temperature can now be lower. Further, as the size of the beds in the dehydration unit 200 are set by the inlet flowrate (stream 102) the dehydration is smaller than in FIG. 3.

Figure 5:
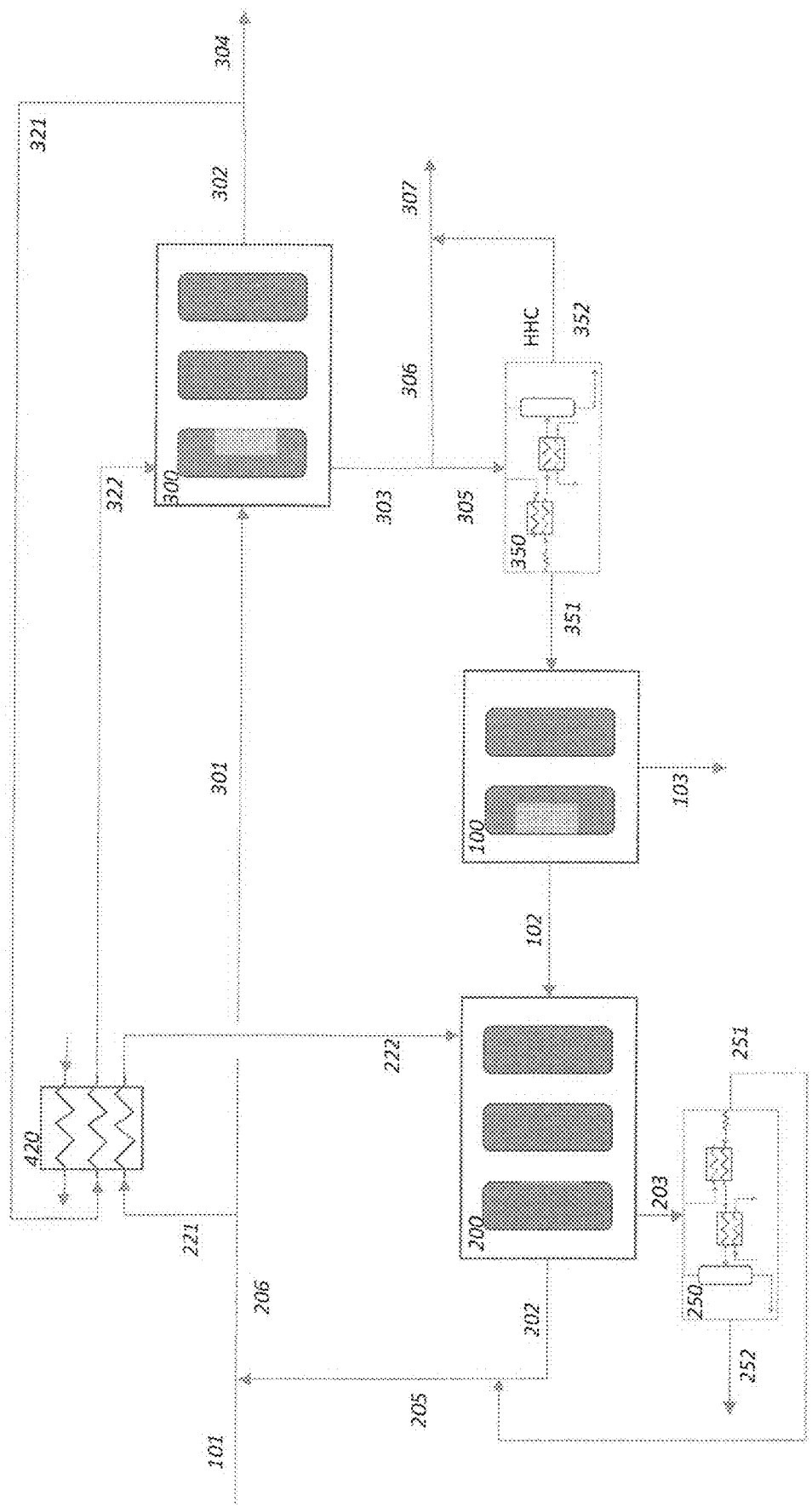
FIG. 5 shows an arrangement with a single regeneration heater.

In FIG. 5, regeneration heaters 320 and 220 are merged into a single common heater 420. This is possible because if stream 306 is a high fraction of stream 303 then the flowrate of stream 221 in this arrangement can be less than ⅕th of the flowrate of stream 221 in FIG. 1. Therefore, having a separate heater system for the 2 regeneration units would be a costly and unnecessary addition.

Figure 6:
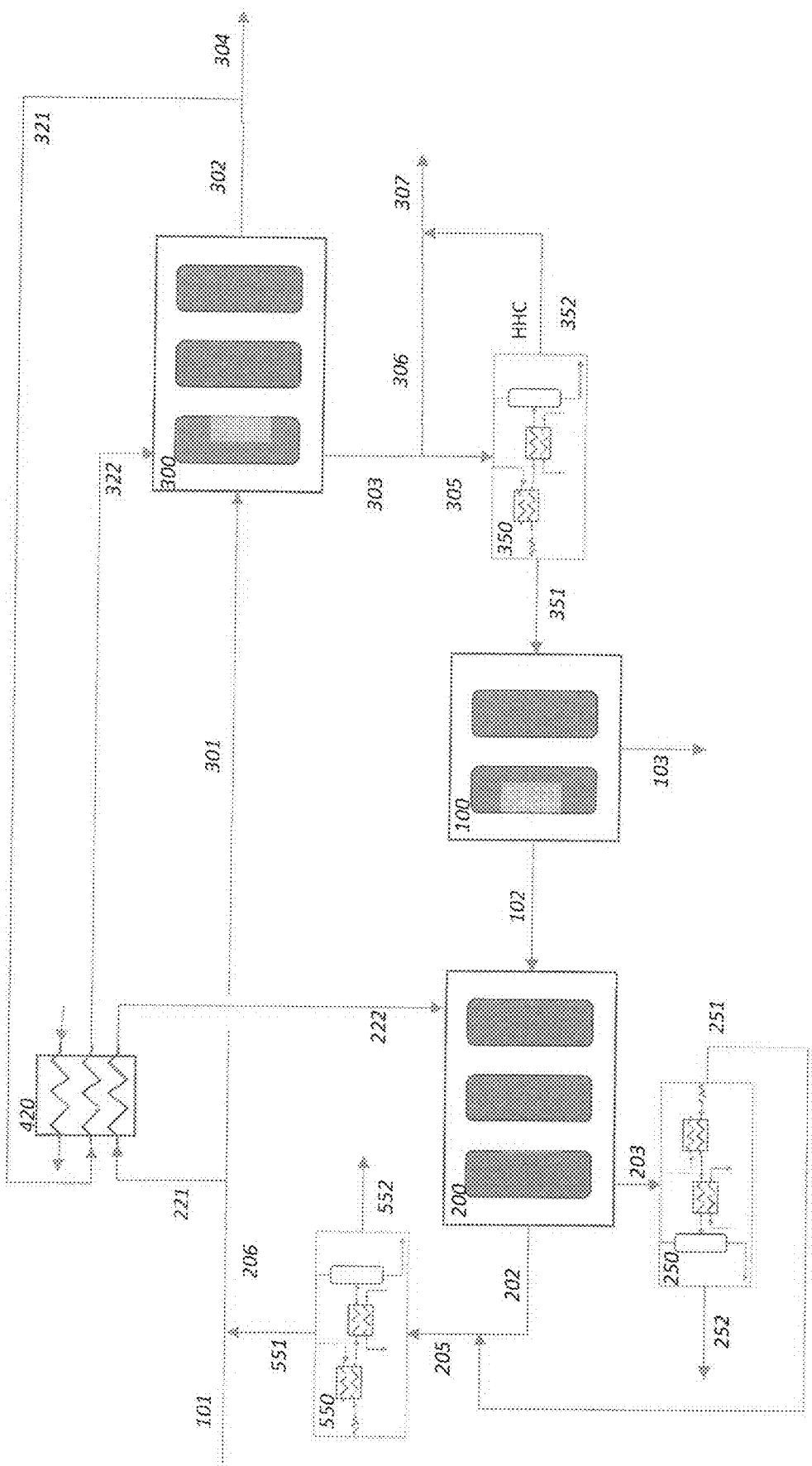
FIG. 6 shows an arrangement with a secondary heavy hydrocarbon knockout unit.

In FIG. 6, a secondary heavy hydrocarbon knockout unit 550 is introduced in stream 205. The levels of heavy hydrocarbons removed from stream 303 are sometimes set by the freezing point of water or the hydrate formation temperature. Due to temperature differences in heat exchangers, this may limit the heavy hydrocarbon dew point in stream 351 to not be less than 4.5° C. (40° F.). If lower concentrations are needed then the moisture needs to be removed prior to the lower temperatures. This moisture is removed in dehydration 200, and stream 205 is sent to secondary heavy hydrocarbon knockout unit 550. This unit 550 generates stream 551, and a secondary waste hydrocarbon stream 552. Stream 552 could be disposed of separately, or also mixed with stream 306 in the same way as stream 352.

Figure 7:
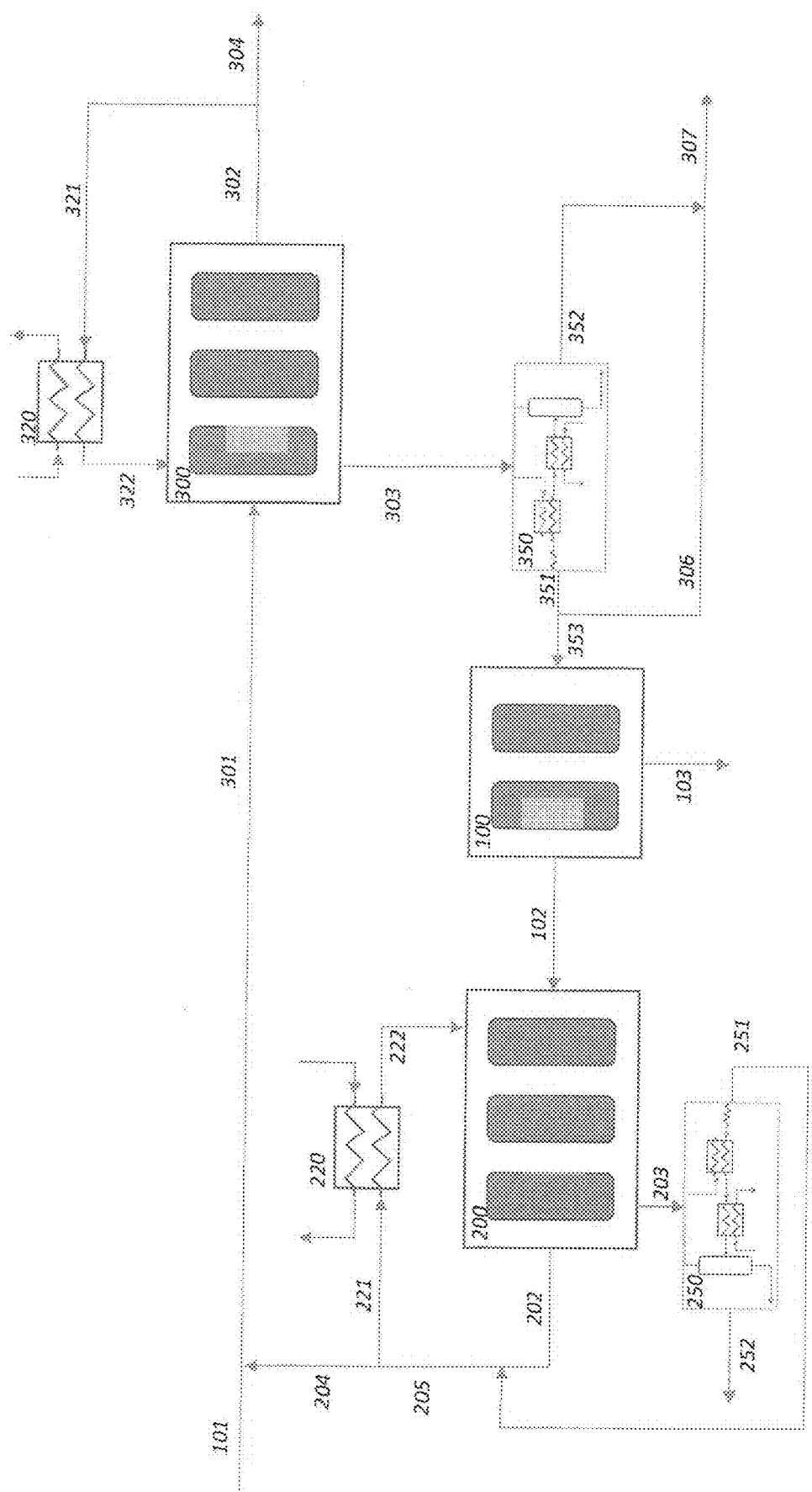
FIG. 7 shows an arrangement with improved BTU control for the fuel gas stream.

In FIG. 7, when using the fuel gas stream 307 to be burned in a gas turbine or other similar unit, the control on the BTU value of this stream becomes very important. This arrangement solves that problem by removing stream 306 from lean regeneration stream 351 forming secondary lean regeneration stream 353. Stream 353 is then fed to amine unit 100. As the heavy hydrocarbons levels in stream 351 are set by the operation of the heavy knockout unit 350, they can be tightly controlled. Stream 352 is then introduced into stream 306 in a controlled manner to ensure that the BTU value of fuel gas stream 307 remains inside the operating boundaries set by the downstream process equipment.

Figure 8:
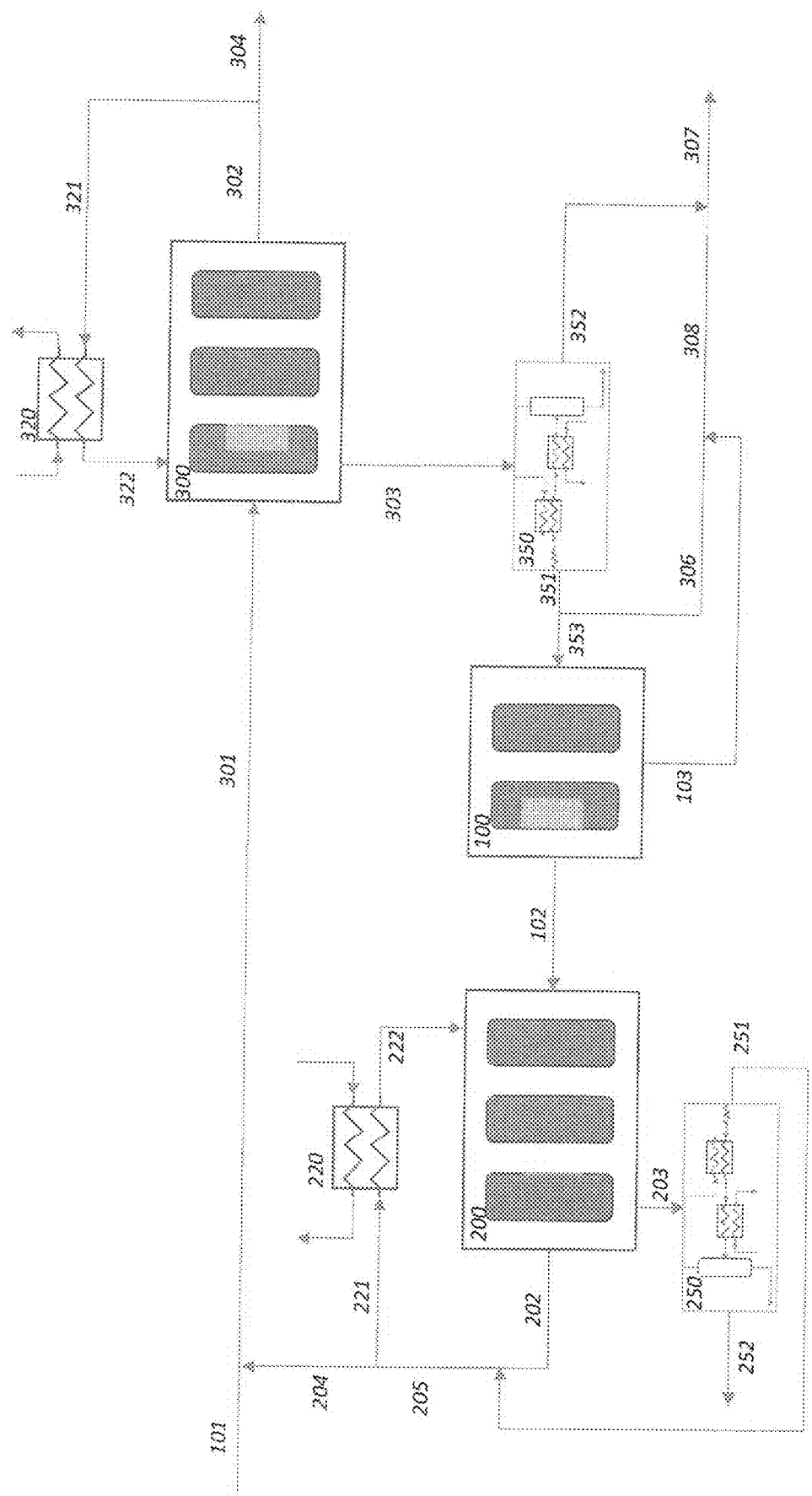
FIG. 8 shows another arrangement with improved recovery of fuel gas and improved BTU control for the fuel gas.

In FIG. 8, the acid gas stream 103 is mixed with stream 306 in order to recover additional fuel as well as potentially improve the BTU value of fuel gas stream 307 further.

Figure 9:
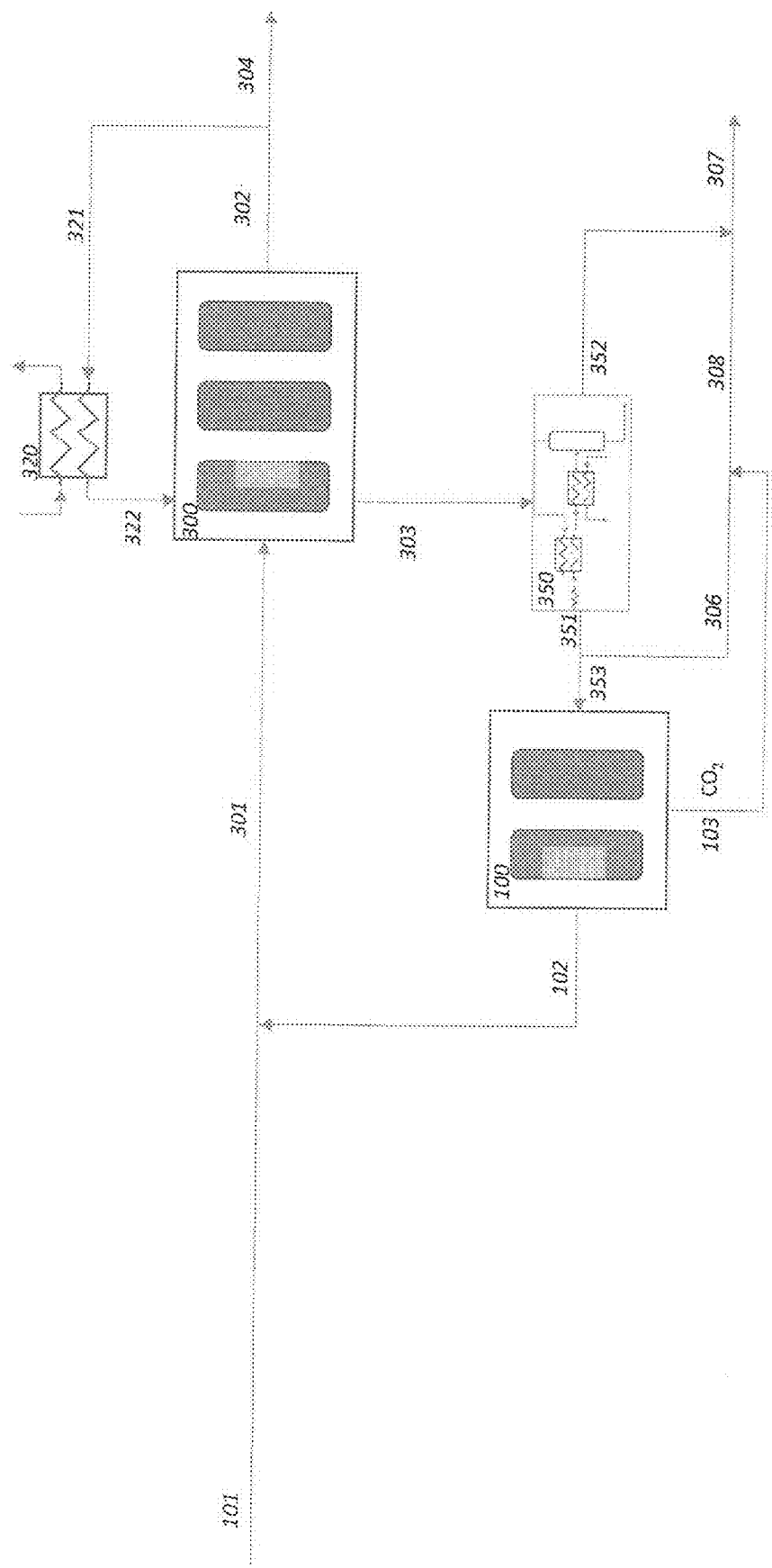
FIG. 9 shows an embodiment with no separate dehydration unit but improved BTU control.

In FIG. 9, the heavy knockout unit 350 is operated in such a way that the moisture load does no build up in the regen loop. For example, if the moisture dew point of stream 353 is the same as stream 102, then no additional water would be transferred into the regeneration loop. Therefore, as long as the heavy knockout unit can achieve this target, the need for a dehydration unit is eliminated. This would make substantial savings to the capital cost of a unit designed to remove CO2 and heavy hydrocarbons from a process gas.

Figure 10:
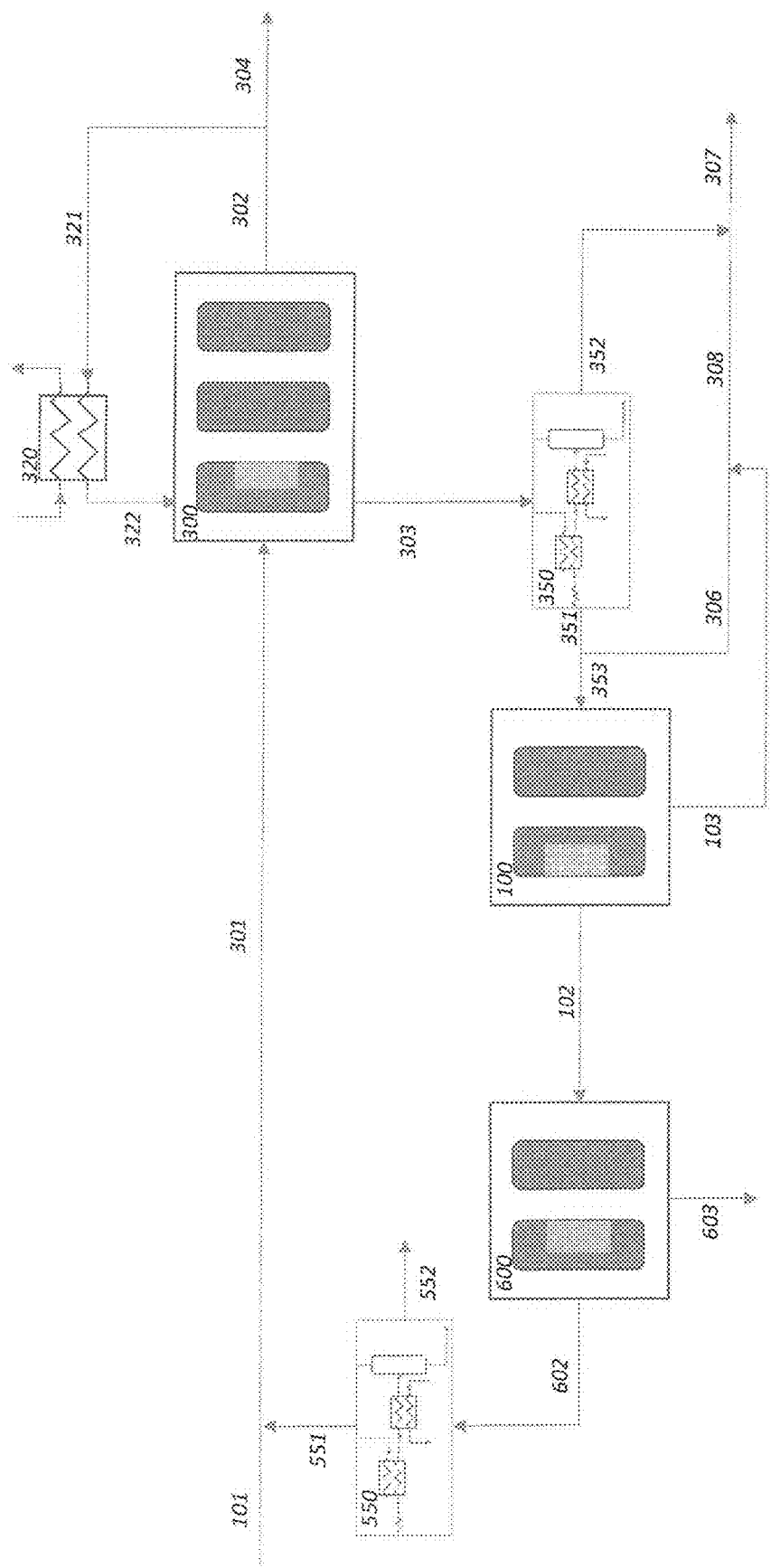
FIG. 10 shows an embodiment that includes a triethylene glycol unit to remove water as well as improved BTU control.

In FIG. 10, the levels of heavy hydrocarbons in stream 102 need to be reduced further. Instead of a dehydration unit, a lower cost triethyleneglycol (TEG) unit 600 is used, producing a dry sweet regeneration stream 602 and a regeneration waste water stream 603. Stream 602 is then introduced into secondary heavy hydrocarbon knockout unit 550 where it can operate at temperatures below either the freezing point of water or hydration formation temperature Any of the above amine units, adsorption units, dehydration units and other components such as conduits, unit devices, scaffolding, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

SPECIFIC EMBODIMENTS

While the following is described in conjunction with specific embodiments, it will be understood that this description is intended to illustrate and not limit the scope of the preceding description and the appended claims.

A first embodiment of the invention is a process for treating a feed gas comprising sending the feed gas through an adsorbent bed to remove contaminants selected from the group consisting of C5+, aromatic compounds, sulfur compounds, carbon dioxide, and water to produce a partially treated gas stream and a spent regeneration stream containing said contaminants; and sending the spent regeneration gas stream through a vessel containing an amine solvent to produce a partially treated gas stream and a waste stream comprising carbon dioxide and water. An embodiment of the invention is one, any or all of prior embodiments in this paragraph up through the first embodiment in this paragraph further comprising sending the partially treated gas stream to at least one adsorbent bed to absorb water and produce a dried treated gas stream. An embodiment of the invention is one, any or all of prior embodiments in this paragraph up through the first embodiment in this paragraph further comprising sending the partially treated gas stream to a vessel containing triethylene glycol to absorb water and produce a dried treated gas stream. An embodiment of the invention is one, any or all of prior embodiments in this paragraph up through the first embodiment in this paragraph wherein a portion of the feed is heated to produce a heated stream and returned to the adsorbent bed. An embodiment of the invention is one, any or all of prior embodiments in this paragraph up through the first embodiment in this paragraph wherein a portion of the dried treated gas stream is sent as a regeneration gas stream to the at least one adsorbent bed to produce a wet stream to be removed from the at least one adsorbent bed. An embodiment of the invention is one, any or all of prior embodiments in this paragraph up through the first embodiment in this paragraph wherein the wet stream is sent through a condenser to produce a liquid water stream. An embodiment of the invention is one, any or all of prior embodiments in this paragraph up through the first embodiment in this paragraph wherein the spent regeneration gas is sent to a heavy knock out drum to produce a treated stream and a heavy hydrocarbon stream and then the heavy hydrocarbon stream is mixed with a portion of the spent regeneration gas stream to produce a fuel gas stream. An embodiment of the invention is one, any or all of prior embodiments in this paragraph up through the first embodiment in this paragraph wherein the spent regeneration gas is sent to the vessel containing an amine solvent to produce a waste stream comprising carbon dioxide and hydrogen sulfide and a stream comprising water. An embodiment of the invention is one, any or all of prior embodiments in this paragraph up through the first embodiment in this paragraph wherein the stream comprising water is sent to a dehydration unit to produce a lean recycle gas stream and a wet stream. An embodiment of the invention is one, any or all of prior embodiments in this paragraph up through the first embodiment in this paragraph wherein the wet stream is cooled in a water knockout system to produce a liquid water stream and a recycle stream to be returned to the dehydration unit. An embodiment of the invention is one, any or all of prior embodiments in this paragraph up through the first embodiment in this paragraph wherein the treated gas stream is sent through a dehydration unit to produce a dry hydrocarbon stream and a wet stream. An embodiment of the invention is one, any or all of prior embodiments in this paragraph up through the first embodiment in this paragraph wherein the dry hydrocarbon stream is sent through a heavy hydrocarbon knock out unit to produce a recycle stream and a waste heavy hydrocarbon stream. An embodiment of the invention is one, any or all of prior embodiments in this paragraph up through the first embodiment in this paragraph wherein the recycle stream is returned to the feed gas stream. An embodiment of the invention is one, any or all of prior embodiments in this paragraph up through the first embodiment in this paragraph wherein the contaminants are sent to a heavy knock out drum to produce a waste stream comprising C5+, aromatic compounds, sulfur compounds and water and a stream to be sent to a dehydration unit. An embodiment of the invention is one, any or all of prior embodiments in this paragraph up through the first embodiment in this paragraph wherein the waste stream further comprises hydrogen sulfide and is combined with a stream containing the contaminants to produce a fuel gas stream. An embodiment of the invention is one, any or all of prior embodiments in this paragraph up through the first embodiment in this paragraph wherein the feed gas is treated without a separate dehydration unit. An embodiment of the invention is one, any or all of prior embodiments in this paragraph up through the first embodiment in this paragraph, further comprising at least one of sensing at least one parameter of the process and generating a signal from the sensing; sensing at least one parameter of the process and generating data from the sensing; generating and transmitting a signal; and generating and transmitting data.

The invention claimed is:

1. A process for treating a feed gas comprising:
sending said feed gas through an adsorbent bed and a secondary device to remove contaminants selected from the group consisting of $C_{5+}$, an acidic gas comprising carbon dioxide, hydrogen sulfide or both, and water to produce a treated gas stream and a spent regeneration stream containing said contaminants; and
eventually sending said spent regeneration stream through a vessel containing an amine solvent to produce a partially treated gas stream and a waste stream comprising acid gas and water.

2. The process of claim 1 further comprising sending said partially treated gas stream to at least one adsorbent bed to absorb water and produce a dried treated gas stream.

3. The process of claim 1 further comprising sending said partially treated gas stream to a vessel containing triethylene glycol to absorb water and produce a dried treated gas stream.

4. The process of claim 1 wherein a portion of said feed is heated to produce a heated stream and returned to said adsorbent bed.

5. The process of claim 2 wherein a portion of said dried treated gas stream is sent as a regeneration gas stream to said at least one adsorbent bed to produce a wet stream to be removed from said at least one adsorbent bed.

6. The process of claim 5 wherein said wet stream is sent through a condenser to produce a liquid water stream.

7. The process of claim 1 wherein said spent regeneration gas is sent to a heavy knock out drum to produce a treated stream and a heavy hydrocarbon stream and then said heavy hydrocarbon stream is mixed with a portion of said spent regeneration gas to produce a fuel gas stream.

8. The process of claim 1 wherein said spent regeneration gas is sent to said vessel containing an amine solvent to produce a waste stream comprising carbon dioxide and hydrogen sulfide and a stream comprising water.

9. The process of claim 8 wherein said stream comprising water is sent to a dehydration unit to produce a lean recycle gas stream and a wet stream.

10. The process of claim 9 wherein said wet stream is cooled in a water knockout system to produce a liquid water stream and a recycle stream to be returned to said dehydration unit.

11. The process of claim 1 wherein said treated gas stream is sent through a dehydration unit to produce a dry hydrocarbon stream and a wet stream.

12. The process of claim 11 wherein said dry hydrocarbon stream is sent through a heavy hydrocarbon knock out unit to produce a recycle stream and a waste heavy hydrocarbon stream.

13. The process of claim 12 wherein said recycle stream is returned to said feed gas stream.

14. The process of claim 1 wherein said contaminants are sent to a heavy knock out drum to produce a waste stream comprising $C_{5+}$, aromatic compounds, sulfur compounds and water and a stream to be sent to a dehydration unit.

15. The process of claim 1 wherein said waste stream further comprises hydrogen sulfide and is combined with a stream containing said contaminants to produce a fuel gas stream.

16. The process of claim 1 wherein said feed gas is treated without a separate dehydration unit.

* * * * *